United States Patent [19]
Hino et al.

[11] Patent Number: 5,418,519
[45] Date of Patent: May 23, 1995

[54] ELECTRONIC CIRCUIT DEVICE HAVING AN ELECTRIC-CODE LOCKING FUNCTION

[75] Inventors: Yuji Hino; Ryou Tomohiro, both of Hyogo, Japan

[73] Assignee: Mitsubishi Denki Kabushiki Kaisha, Tokyo, Japan

[21] Appl. No.: 998,601

[22] Filed: Dec. 30, 1992

[30] Foreign Application Priority Data

Jan. 13, 1992 [JP] Japan .................................. 4-003918

[51] Int. Cl.⁶ .............................................. B60R 25/10
[52] U.S. Cl. ..................................... 340/426; 340/542; 340/825.32; 307/10.2; 455/345
[58] Field of Search ........... 340/426, 542, 543, 825.31, 340/825.3, 825.32, 825.34; 455/344–349; 307/9.1, 10.1, 10.2

[56] References Cited
U.S. PATENT DOCUMENTS 4,743,894  5/1988  Bochmann ........................ 340/426
4,838,377  6/1989  Kozaki et al. ..................... 340/426

FOREIGN PATENT DOCUMENTS 59-128832  1/1984  Japan .

Primary Examiner—Donnie L. Crosland

[57] ABSTRACT

An electronic circuit device having an electric-code locking functions so that when the electronic circuit device is electrically connected to a battery, a control circuit is activated to cause a power supply detecting circuit to detect whether the electronic circuit device has been stolen. When a proper code is input by a control input unit after the completion of its detection, the electronic circuit device can be normally operated. In response to another simple operation signal input from the control input unit, the control circuit controls a radio receiving circuit, a tape circuit and a muting circuit in such a manner that the electronic circuit device is temporarily brought to the normal operation state. That is, the electronic circuit device can be provided with an additional function for temporarily bringing the electronic circuit device to an operation state by inputting an operation signal other than a signal indicative of a mnemonic in order to improve the efficiency of its fabrication.

16 Claims, 5 Drawing Sheets

ELECTRONIC CIRCUIT DEVICE HAVING AN ELECTRIC-CODE LOCKING FUNCTION

BACKGROUND OF THE INVENTION

1. Field of the Invention

The present invention relates to an improvement in an electronic circuit device having an electric-code locking function (hereinafter abbreviated as "electronic circuit").

2. Description of the Background Art

FIG. 1 shows the configuration of this type of conventional electronic circuit device. In FIG. 1, reference numeral 1 indicates an antenna 1. Designated at numeral 2 is a radio receiving circuit for receiving a radio broadcast from the antenna 1. The radio receiving circuit 2 comprises a high frequency amplifier, a local oscillator, a mixer, an intermediate frequency amplifier, a detecting circuit, a noise killer circuit, a multiplexing circuit, etc. Designated at numeral 3 is a tape circuit which comprises a tape deck and an equalizing circuit.

Designated at numeral 4 is a signal switching circuit for selecting either one of signals output from the radio receiving circuit 2 and the tape circuit 3. Reference numeral 5 indicates a muting circuit supplied with the selected signal and for effecting a muting operation. Reference numeral 6 indicates a low frequency amplifying circuit for amplifying the output of the muting circuit 5, and reference numeral 7 indicates a speaker electrically connected to the low frequency amplifying circuit 6. Designated at numeral 8 is a power supply detecting circuit for detecting whether or not a battery 15 used as a power supply is electrically connected to the electronic circuit device through a connector 14. Reference numeral 10 indicates a mnemonic code holding circuit comprised of a non-volatile memory or a diode matrix or the like used to store mnemonic codes therein in advance.

Designated at numeral 11 is a control input unit for inputting mnemonic and collating codes and for controlling a radio, for example. Reference numeral 12 indicates a displaying driver and reference numeral 13 indicates a display for displaying the frequency received by the radio, for example. Designated at numeral 14 is a connector electrically connected to the inputs of the control circuit 16 and the power supply detecting circuit 8. Reference numeral 15 denotes a battery electrically connected to the connector so as to be detachable from the electronic circuit device. Reference numeral 16 indicates a control circuit which has inputs electrically connected to the power supply detecting circuit 8, the mnemonic code holding circuit 10, the control input unit 11 and the connector 14 and which effects various control of the radio receiving circuit 2, the tape circuit 3, the muting circuit 5 and the displaying driver 12 in response to their corresponding input signals.

The operation of the electronic circuit device will next be described below. When the electronic circuit device is in a normal operation state, the control circuit 16 controls the radio receiving circuit 2 and the tape circuit 3 in response to an operation signal input from the control input unit 11 and provides control so as to bring the muting circuit 5 to a non-operation state. Further, the control circuit 16 drives the displaying driver 12 so as to display the received frequency or the like on the display 13. On the other hand, the signal switching circuit 4 selects either one of the signals output from the radio receiving circuit 2 and the tape circuit 3. The selected signal passes through the muting circuit 5 and the low frequency amplifying circuit 6 so as to be output from the speaker 7 as an acoustic signal.

When the electronic circuit device is first connected to the battery 15 or when the electronic circuit device is re-connected to the battery 15 after it has been disconnected from the battery 15, the power supply detecting circuit 8 detects that the battery 15 used as the power supply has been connected to the electronic circuit device. In response to the detected signal output from the power supply detecting circuit 8, the control circuit 16 then detects if the electronic circuit device has been disconnected from the battery 15, i.e., it has been stolen.

The control circuit 16 is activated upon detection of disconnection so as to bring the muting circuit 5 to an operation state and to bring the radio receiving circuit 2 and the tape circuit 3 to a non-operation state until a code identical to one of the mnemonic codes which have been stored in the mnemonic code holding circuit 10, is input from the control input unit 11, thereby prohibiting the electronic circuit device from operating. If a proper code is input before the execution of, for example, a third input operation by the control input unit 11, then such a prohibited state is unlocked. When, however, mnemonic codes are continuously misinput three times, for example, the prohibited state is locked.

A description will next be made of a mnemonic code process of the control circuit 16 with reference to FIG. 2. When the power supply is turned on in Step S1, the control circuit 16 makes a judgment, based on the result of detection by the power supply detecting circuit 8, as to whether or not the electronic circuit device has been disconnected from the battery 15, that is, the electronic circuit device has been stolen. If the answer is determined to be No, then the routine proceeds to Step S10 where the electronic circuit device can be normally operated.

If, on the other hand, the answer is determined to be Yes in Step S2, then the routine proceeds to Step S3 where a message of "CODE" is displayed on the display 13 and a waiting state for input of a mnemonic and collating code is entered. Next, in Step S4, codes such as numerals corresponding to preset channels are input from the control input unit 11 by pressing the preset channels of a radio, for example. The input codes are successively displayed on the display 13.

When all the mnemonic and collating codes are input, one of the mnemonic codes, which have been stored in the nemonic code holding circuit 10, is compared with one of the codes referred to above in Step S5. If it is determined that the proper mnemonic and collating code has been input, then a failure counter is reset in Step S9. The routine then proceeds to Step S10 where the electronic circuit device can be normally operated.

If, on the other hand, it is determined in Step S5 that the input mnemonic and collating code differs from the mnemonic code and is erroneous, then the routine proceeds to Step S6 where the failure counter is incremented by +1. It is thereafter determined in Step S7 whether or not the count of the failure counter is equal to a positive integer n (n=3, for example). If the answer is determined to be No, then the routine is returned to Step S3 wherein subsequently a desired code is reinput. If the answer in Step S7 is determined to be Yes, it is then judged that the mnemonic and collating code has not been properly input n times. Therefore, the muting circuit 5 is brought to an operation state, and a message of "OFF" is displayed on the display 13 in a state in which the radio receiving circuit 2 and the tape circuit 3 remain nonoperational. Thus, the electronic circuit device is brought to a locked state shown in Step S8 in which all the operations other than the turning ON and OFF of the power supply are prevented.

In the above conventional example, the mnemonic code has been stored and set up in advance. However, an electronic circuit device is known which can be provided with backup power and which enables the input and set-up of mnemonic codes, as has been disclosed in Japanese Patent Application Publication No. 3-3974, for example.

The conventional electronic circuit device has been constructed as described above. Thus, when the normal operation is effected after the electronic circuit device has been stolen, a code, which coincides with a mnemonic code peculiar to the electronic circuit device, must be input. Therefore, when the electronic circuit device is activated to check its operation or the like upon its fabrication, it is necessary to input individual different mnemonic and collating codes, thereby causing a problem that the work efficiency is impaired.

SUMMARY OF THE INVENTION

In view of the foregoing, it is an object of the present invention to provide an electronic circuit device which can be brought to a normal operation state with a simple operation without impairing an antitheft function and without inputting a mnemonic and collating code upon mass production and which enables an improvement in the efficiency of fabrication.

It is another object of the present invention to provide an electronic circuit device which can be brought to a normal operation state with a simple operation without inputting a mnemonic and collating code and is capable of limiting the number of temporary resetting operations.

According to one aspect of the invention, for achieving the above-mentioned objects, there is provided an electronic circuit device with an electric-code locking function, which is capable of effecting a normal operation by inputting an operation signal peculiar to the electronic circuit device from an inputting unit after the stolen state of electronic circuit device has been detected by a detector, which comprises a temporary resetting unit for temporarily enabling the normal operation by inputting an operation signal common to the electronic circuit device.

According to another aspect of the invention, there is provided an electronic circuit device with an electric-code locking function, which is capable of effecting a normal operation by inputting an operation signal peculiar to the electronic circuit device from an inputting unit after the stolen state of electronic circuit device has been detected by a detector, which comprises a temporary resetting unit for temporarily enabling the normal operation by inputting an operation signal common to the electronic circuit device, and a number-of-operations limiter for limiting the number of operations for temporarily resetting the electronic circuit device to the normal operation.

As stated above, the electronic circuit device according to the present invention can be temporarily brought to the normal operation state without inputting a mnemonic and collating code by generating the operation signal common to the electronic circuit device with a simple operation different than the normal operation which is unable to provide such an operation signal and by using the temporary resetting unit input with the operation signal.

Further, the electronic circuit device according to the present invention enables the number-of-operations limiter to limit the number of operations for temporarily bringing the electronic circuit device to the normal operation state.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Preferred embodiments of the invention will now be described in detail referring to the accompanying drawings.

Figure 1:
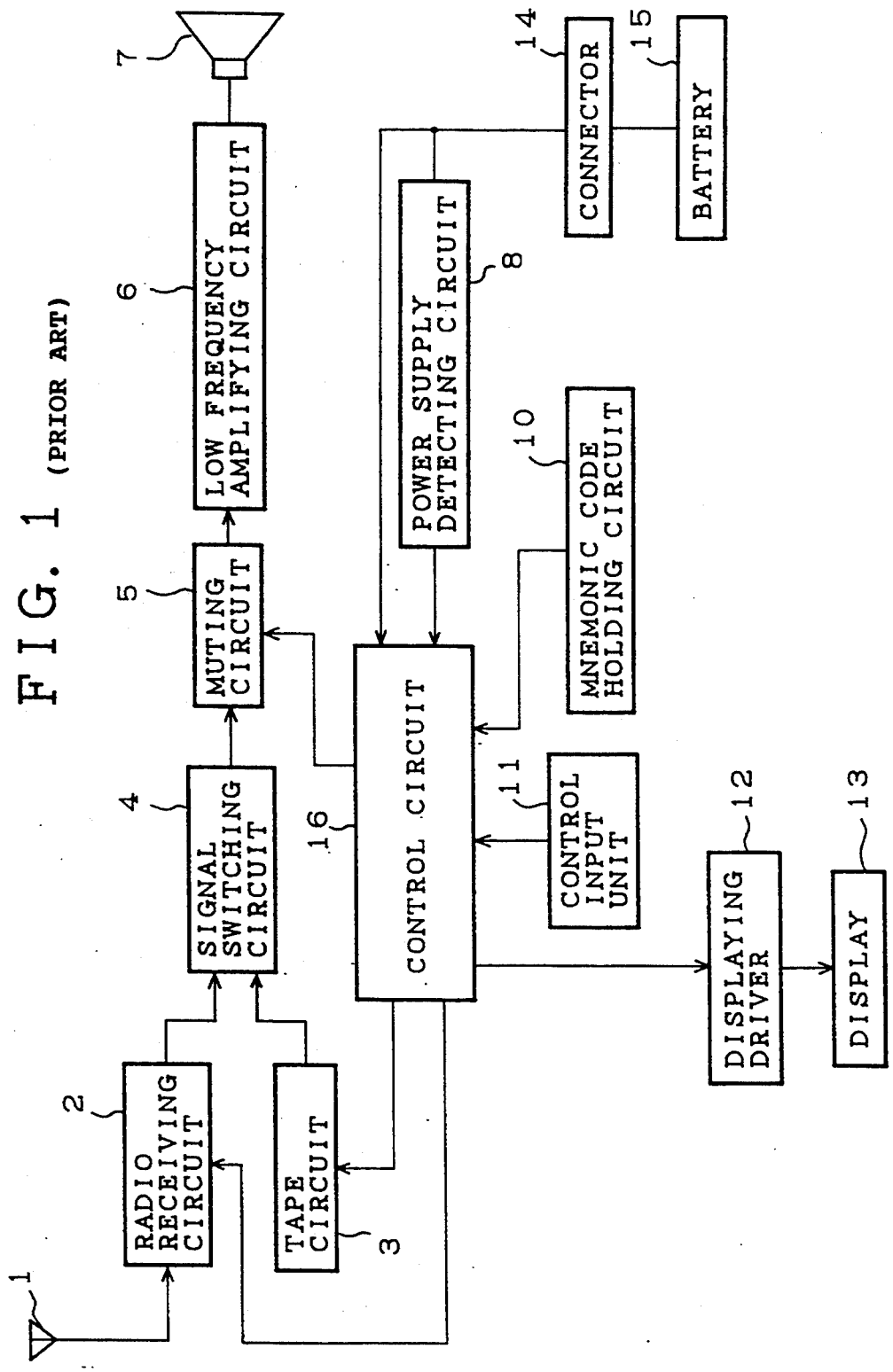
FIG. 1 is a block diagram showing the configuration of a conventional electronic circuit device.
Figure 2:
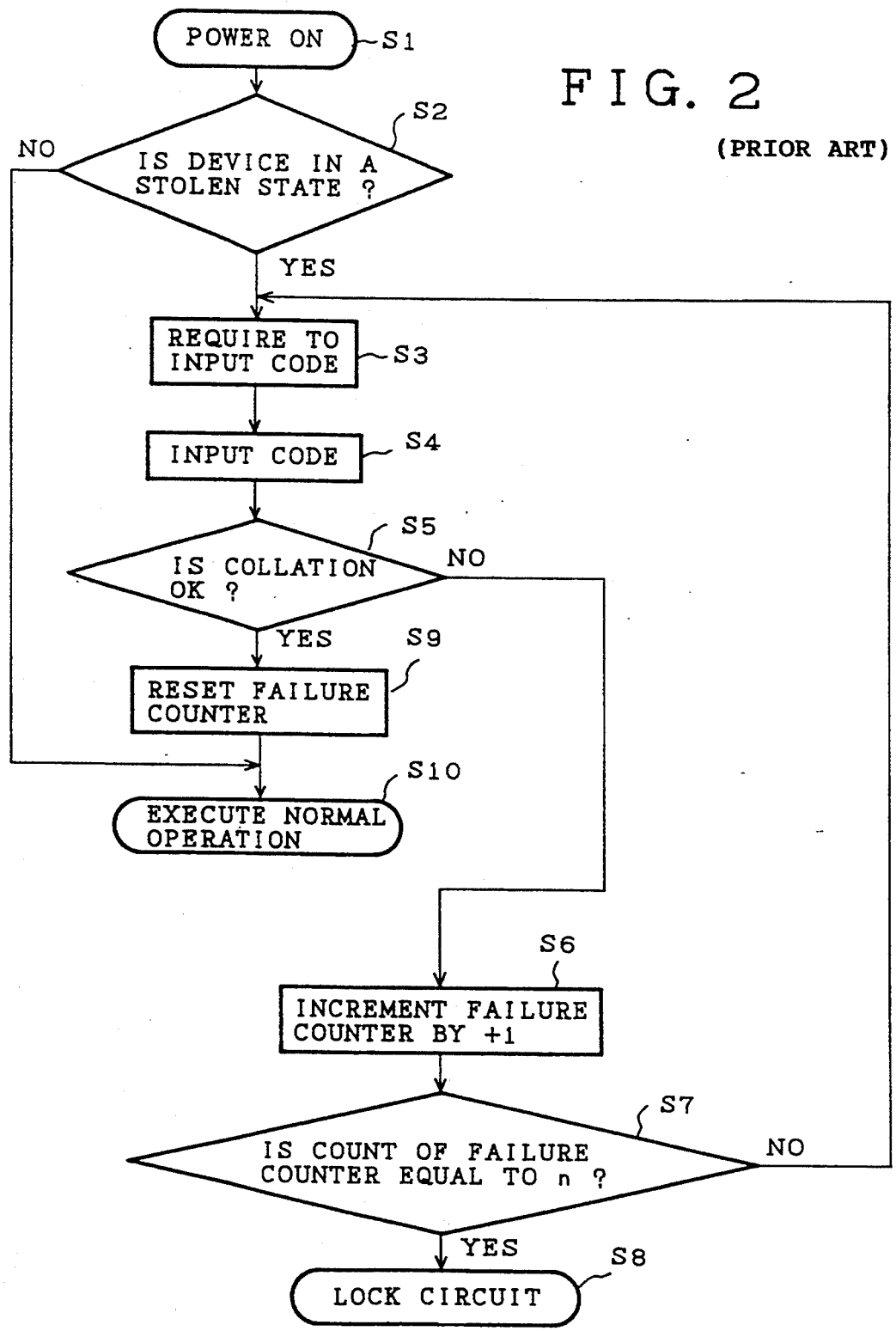
FIG. 2 is a flowchart for describing the operation of a control circuit employed in the conventional electronic circuit device.
Figure 3:
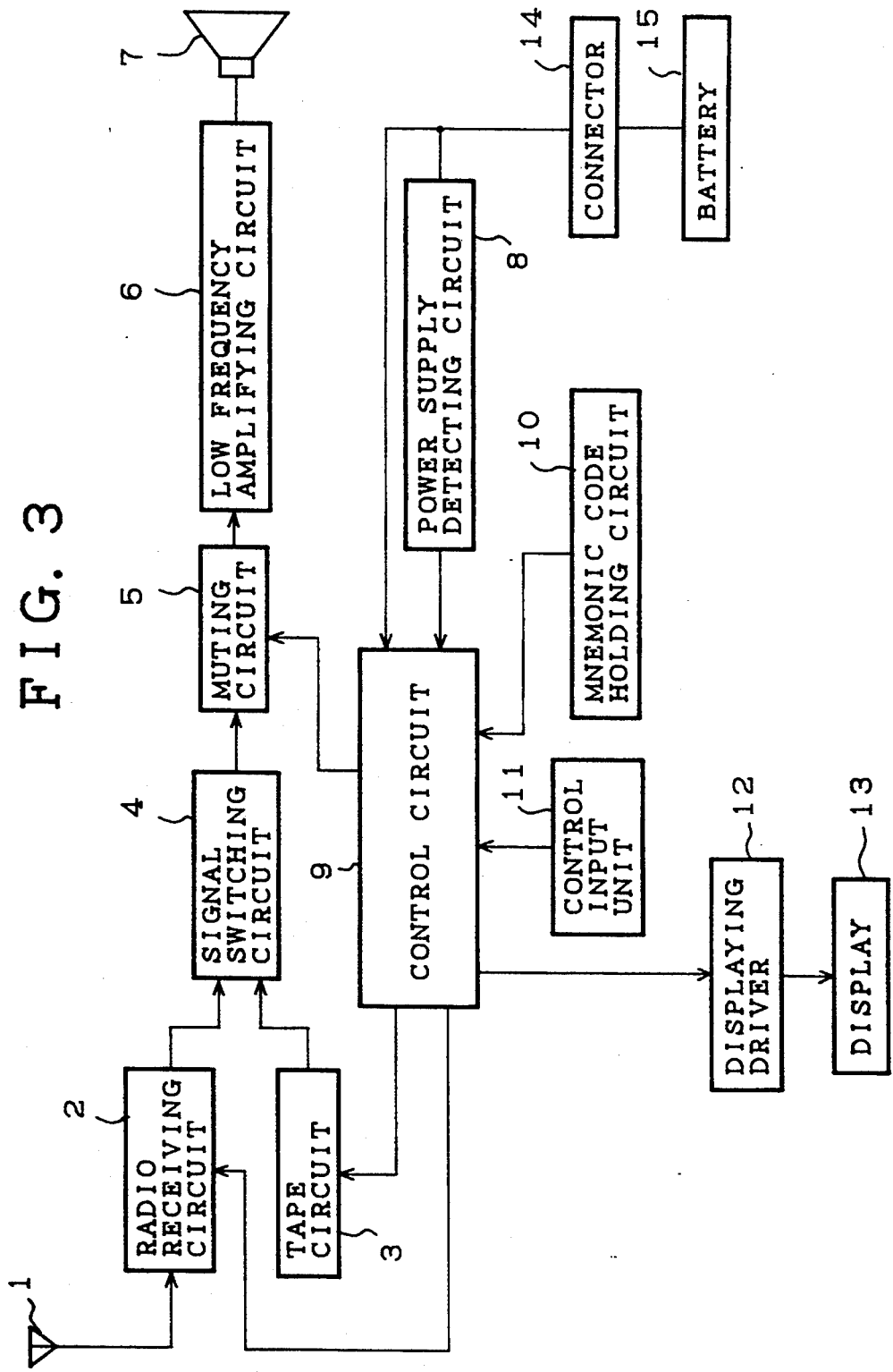
FIG. 3 is a block diagram illustrating the configuration of an electronic circuit device according to a first embodiment of the present invention.
Figure 4:
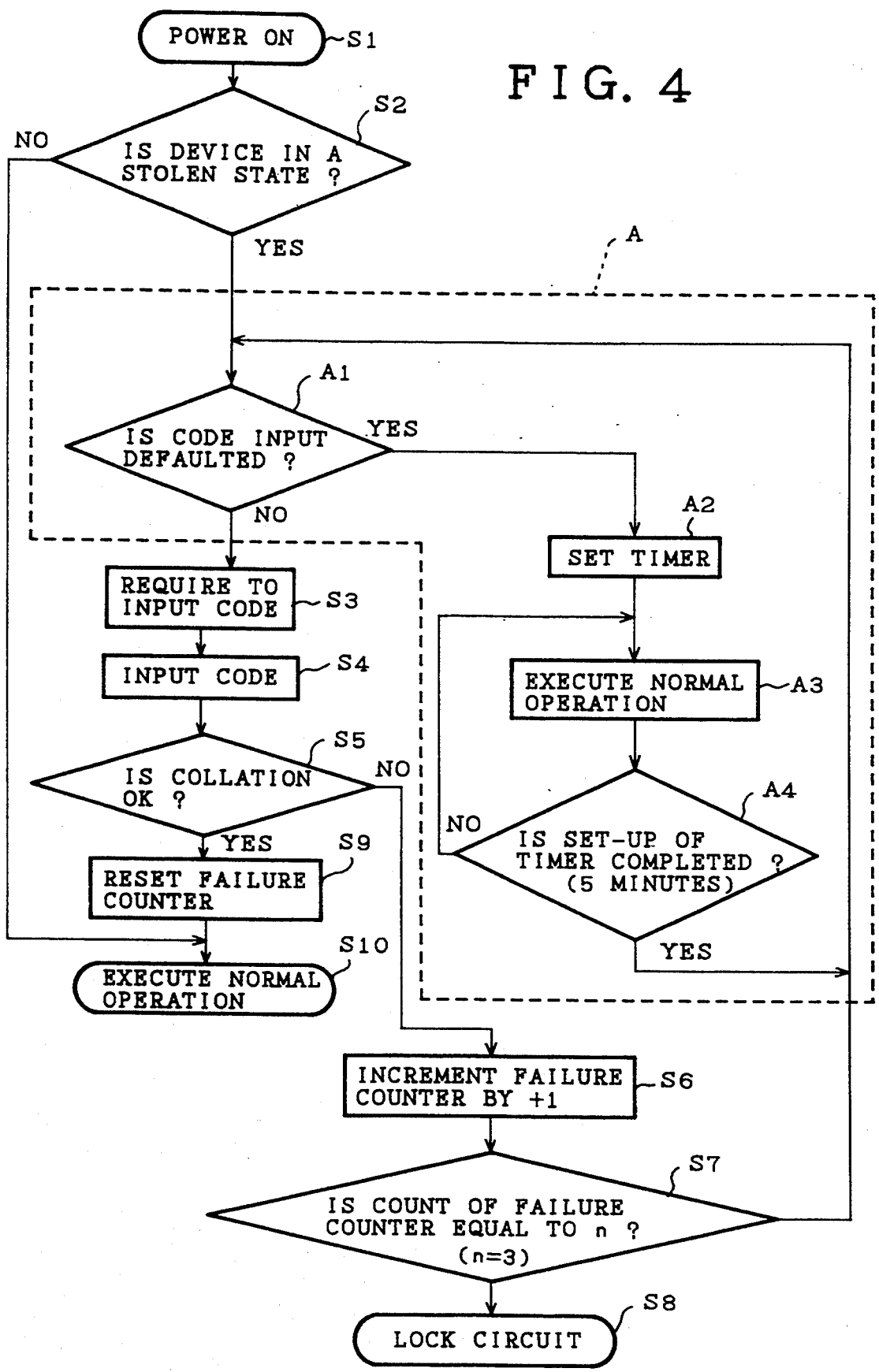
FIG. 4 is a flowchart for describing the operation of a control circuit employed in the electronic circuit device shown in FIG. 3.

FIG. 3 shows the configuration of an electronic circuit device according to a first embodiment of the present invention. The electronic circuit device shown in FIG. 3 is identical in structure to a conventional electronic circuit device shown in FIG. 1 except that a control circuit 9 is used as an alternative to a control circuit 16 shown in FIG. 1. The same elements of structure as those employed in the conventional electronic circuit are identified by the same reference numerals 1 through 8 and 10 through 15 as those shown in FIG. 1, and their description will therefore be omitted. FIG. 4 is a flowchart for describing the operation of the control circuit 9. The same steps as those employed in the conventional example shown in FIG. 2 are identified by the same steps S1 through S10.

The operation of the first embodiment will next be described below with reference to FIGS. 3 and 4. However, the normal operation of the electronic circuit device and the state or manner of inhibition of the electronic circuit device from operating are identical to those described in the conventional example except for the operation of the control circuit 9 used as an alternative to the control circuit 16, and their description will therefore be omitted. When a power supply of the electronic circuit device is turned on in Step S1, it is determined in Step S2 whether or not the electronic circuit device has been disconnected from a battery 15, i.e., whether the electronic circuit device has been stolen. If the answer is determined to be No, then the routine proceeds to Step S10 where the normal operation can be effected. If the answer is determined to be Yes, then the routine proceeds to Step A1.

It is determined in Step A1 whether or not an operation (special operation common to the device, for example) for omitting or defaulting a code input has been effected by a control input unit 11. The operation for defaulting the code input is carried out by simultaneously operating a plurality of operations keys on the control input unit 11, for example. This operation shows a special operation which cannot be effected by the normal operation of a user. It is also preferable to use a simple operation method.

If the answer is determined to be Yes in Step A1, then a timer is set in Step A2. Then, the routine proceeds to Step A3 where the electronic circuit device is temporarily maintained at a normal operation state (until the setting of the timer is completed). It is determined in Step A4 whether or not the timer has been set up. If the answer is determined to be No, then the routine is returned to Step A3. If the answer is determined to be Yes, then the routine is returned to Step A1. The set time of the timer, for bringing the electronic circuit device to the normal operation state can be established as needed. In the present embodiment, however, the time required to set up the timer is 5 minutes, for example.

If the answer is determined to be No in Step A1, then the routine proceeds to Step S3. Since the routine procedure subsequent to Step S3 has been already described in the conventional example, the description of common elements will be omitted. However, the routine procedure executed in the present embodiment differs from that executed in the conventional example in that if it is determined in Step S7 that the count of a failure counter is not equal to n (n=3 for example), then the routine returns to Step A1. That is, a routine procedure A including Steps A1 through A4, which is indicated by the broken line, is additionally provided in addition to the routine procedure executed in the conventional example.

Figure 5:
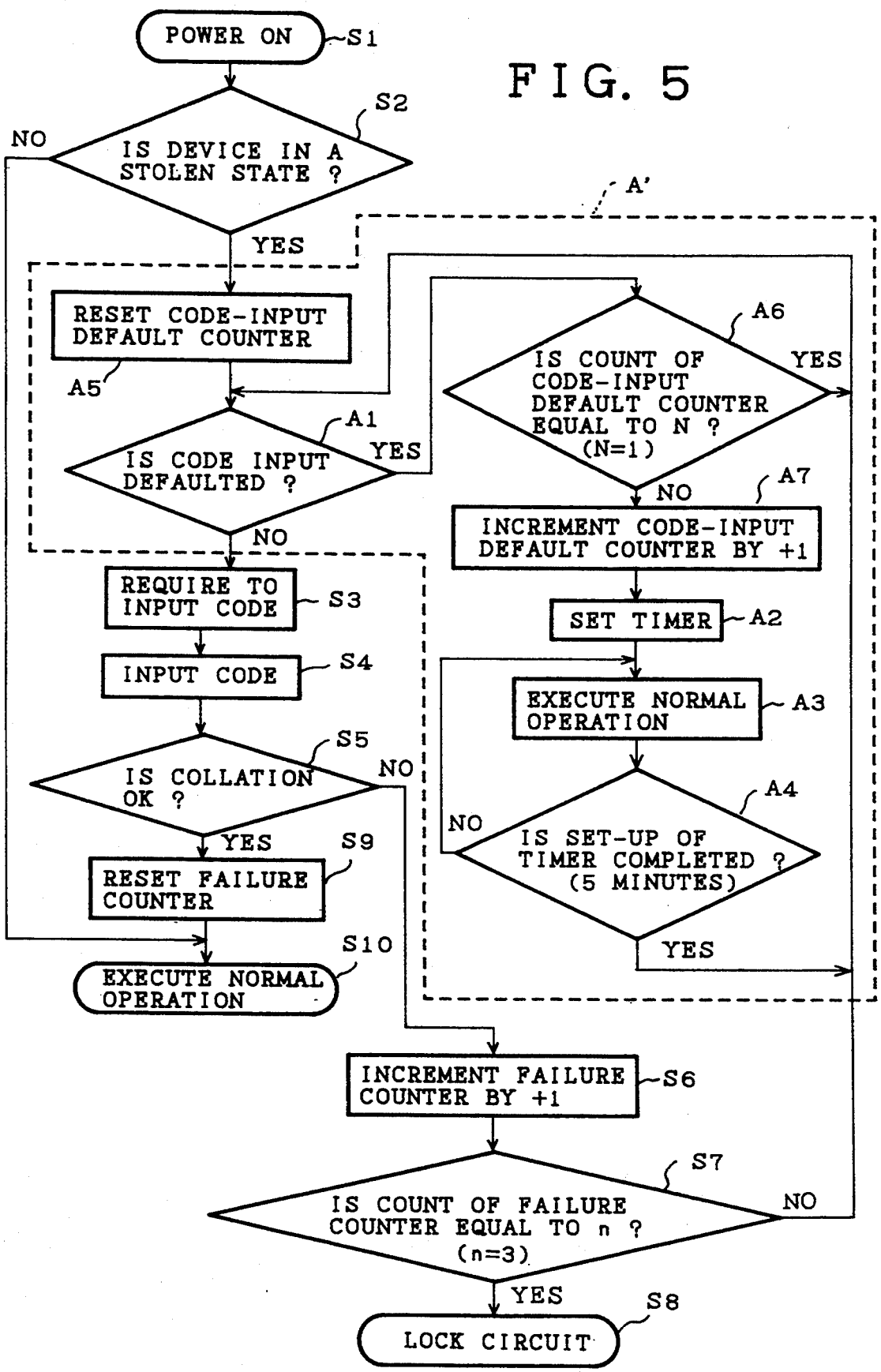
FIG. 5 is a flowchart for describing the operation of a control circuit employed in an electronic circuit device according to a second embodiment of the present invention.

A description will next be made of a second embodiment of the present invention. FIG. 5 is a flowchart for describing the operation different from that of the control circuit 9 shown in FIG. 3. As indicated by a routine procedure A', Steps A5, A6 and A7 are additionally given to the routine procedure A shown in FIG. 4. Further, the counter counts the number of operations for defaulting the code input, and the counted number of operations is limited.

The operation of the second embodiment will now be described with reference to FIG. 5. The power supply is first turned on in Step S1. If it is thereafter determined in Step S2 that the electronic circuit device has been stolen, then the routine proceeds to Step A5 where a code-input default counter is reset to 0.

When the code-input defaulting operation is then effected in Step A1, it is determined in Step A6 whether or not the count of the code-input default counter, which corresponds to the number of past code-input defaulting operations, is equal to a predetermined number of code-input defaulting operations N (e.g., N=1). If the answer is determined to be Yes, then the routine is returned to Step A1 in such a manner that the code-input defaulting operations subsequent to an (N+1)th code-input defaulting operation are not executed. If it is determined in Step A1 that the above count is unequal to and smaller than N, then the routine proceeds to Step A7.

In Step A7, the code-input default counter is incremented by +1. Then, the electronic circuit device is placed in the normal operation state for 5 minutes, for example, in accordance with Steps A2, A3 and A4. Thereafter, the routine is returned to Step A1. Other operations can be apparently understood from the description of the conventional example and the description of FIG. 4, and their description will therefore be omitted.

A third embodiment of the present invention will now be described below. Each of the above embodiments shows a case in which the operation signal common to the electronic circuit device is supplied from the control input unit and the electronic circuit device is reset to the normal operation. However, the present embodiment can bring about the same advantageous effects as those obtained by the above embodiments even if a reset circuit supplies an operation signal common to an electronic circuit device to a control circuit, for example.

According to the present invention, as has been described above, the electronic circuit device can be temporarily brought to the normal operation state by inputting the operation signal common to the electronic circuit device without impairing an antitheft function. It is therefore unnecessary to input codes peculiar to the electronic circuit device upon fabrication of the electronic circuit device. Further, the efficiency of fabrication of the electronic circuit device can be improved.

Further, the number of the temporary resetting operations is limited. Therefore, such operations can be effectively used only when the electronic circuit device is manufactured, and safeguards against theft can be effectively kept.

Having now fully described the invention, it will be apparent to those skilled in the art that many changes and modifications can be made without departing from the spirit or scope of the invention as set forth herein.

What is claimed is:

1. An electronic circuit device with an electric-code locking function comprising:
   input means for inputting a first and second operation signal;
   operation means for effecting a normal operation in response to input of the first operation signal via said input means, the first operation signal being peculiar to the electronic circuit device;
   detecting means for detecting a stolen state of the electronic circuit device, said operation means effecting a normal operation after a stolen state has been detected by said detecting means; and
   temporary resetting means for temporarily enabling normal operation in response to input of the second operation signal which is common to the electronic circuit device, the first and second operation signals being different.

2. The electronic circuit device according to claim 1, further comprising number-of-operations limiting means for limiting a number of operations for temporarily resetting the electronic circuit device to normal operation.

3. An electronic code locking mode of operation for an electronic apparatus comprising:
   a) detecting disablement of a power supply of the electronic apparatus;

b) temporarily enabling a normal operation mode of the electronic apparatus for a predetermined time period after said step (a) of detecting power supply disablement, in response to input of a default code to the electronic apparatus;

c) comparing an operation code input to the electronic apparatus with a stored operation code upon detection of power supply disablement in said step a) or lapsing of the predetermined time period in said step b);

d) disabling the normal operation mode of the electronic apparatus when the operation code does not coincide with the stored operation code in said step c); and e) enabling the normal operation mode of the electronic apparatus when the operation code does coincide with the stored operation code in said step c).

4. The electronic code locking mode of operation of claim 3, wherein said step b) of temporarily enabling the normal operation mode comprises:

b1) comparing the default code to a stored default code;

b2) determining whether a count value is equal to a predetermined count value when the default code coincides with the stored default code in said step b1);

b3) incrementing the count value when it is determined in step b2) that the count value is not equal to the predetermined count value; and b4) enabling the normal operation mode of the electronic apparatus for the predetermined time period subsequent said step b3) of incrementing.

5. The electronic code locking mode of operation of claim 4, wherein said step b) of temporarily enabling the normal operation mode further comprises prohibiting operation of the electronic apparatus upon determination in said step b1) that the default code does not coincide with the stored default code, determination that the count value is equal to the predetermined count value in said step b2) or lapsing of the predetermined time period in step b4).

6. The electronic code locking mode of operation of claim 3, wherein said step d) of disabling the normal operation mode comprises muting the electronic apparatus.

7. The electronic code locking mode of operation of claim 3, wherein detection of power supply disablement in said step a) is indicative of the electronic apparatus having been stolen.

8. The electronic code locking mode of operation of claim 3, wherein said step b) of temporarily enabling the normal operation mode is a test of the electronic apparatus subsequent manufacture thereof.

9. The electronic code locking mode of operation of claim 3, wherein the default code and the first stored code are different.

10. An electronic apparatus comprising:

power supply detection means for detecting when a power supply of the electronic apparatus has been disabled and for generating a power disabled signal;

input means for inputting a default code and an operation code to the electronic apparatus;

first enablement means for temporarily enabling a normal operation mode of the electronic apparatus for a predetermined time period subsequent to generation of the power disabled signal, in response to input of a default code which coincides with a predetermined default code;

comparison means for comparing an input operation code with a predetermined operation code subsequent to generation of the power disabled signal or lapsing of the predetermined time period;

disablement means for disabling the normal operation mode of the electronic apparatus when the input operation code does not coincide with the predetermined operation code; and second enablement means for enabling the normal operation mode of the electronic apparatus when the input operation code coincides with the predetermined operation code.

11. The electronic apparatus of claim 10, further comprising:

default code count means for storing a count value;

first determination means for determining whether the count value of said default code count means is equal to a predetermined count value when the input default code coincides with the predetermined default code; and increment means for incrementing the count value of said default code count means when the count value is not equal to the predetermined count value, said first enablement means temporarily enabling the normal operation mode of the electronic apparatus for the predetermined time period subsequent incrementing of said default code count means.

12. The electronic apparatus of claim 11, wherein said disablement means prohibits the normal operation mode of the electronic apparatus upon determination that the input default code does not coincide with the predetermined default code, determination that the count value of said default code count means is equal to the predetermined count value lapsing of the predetermined time period subsequent incrementing of said default code count means.

13. The electronic apparatus of claim 10, wherein the electronic apparatus is a radio receiver and said disablement means mutes said radio receiver.

14. The electronic apparatus of claim 10, wherein the power disabled signal is indicative that the electronic apparatus has been stolen.

15. The electronic apparatus of claim 10 wherein the temporary enablement of the normal operation mode is a test of the electronic apparatus subsequent manufacture thereof.

16. The electronic apparatus of claim 10, wherein the predetermined operation code and the predetermined default code are different.

* * * * *